United States Patent [19]
Takahashi et al.

[11] Patent Number: 5,965,323
[45] Date of Patent: Oct. 12, 1999

[54] METHOD FOR PREPARING OPTICAL RECORDING MEDIUM

[75] Inventors: Makoto Takahashi; Hajime Utsunomiya, both of Nagano, Japan

[73] Assignee: TDK Corporation, Tokyo, Japan

[21] Appl. No.: 09/023,680

[22] Filed: Feb. 13, 1998

[30] Foreign Application Priority Data

Feb. 27, 1997 [JP] Japan ..................... 9-059837

[51] Int. Cl.⁶ ....................... G11B 7/26
[52] U.S. Cl. ................. 430/270.13; 428/64.6; 428/913; 428/912; 369/275.5; 369/275.2; 430/945
[58] Field of Search ............... 430/279.3, 945; 369/275.2, 275.5; 428/64.6, 913, 912

[56] References Cited

U.S. PATENT DOCUMENTS

| | | | |
|---|---|---|---|
| 3,716,844 | 2/1973 | Brodsky | 430/270.13 |
| 5,385,806 | 1/1995 | Ohno et al. | 430/270.13 |
| 5,736,657 | 4/1998 | Ide et al. | 430/270.13 |

FOREIGN PATENT DOCUMENTS

| | | |
|---|---|---|
| 2-3131 | 1/1990 | Japan . |
| 2-5246 | 1/1990 | Japan . |
| 2-98847 | 4/1990 | Japan . |
| 2-201734 | 8/1990 | Japan . |
| 3-76027 | 4/1991 | Japan . |
| 4-281219 | 10/1992 | Japan . |
| 4-366424 | 12/1992 | Japan . |

OTHER PUBLICATIONS

Yamada et al. "Rapid–phase transitions of Ge Te–Sb2Te3 . . ." J. Appl. Phys. 69(5) pp. 2849–2856, Mar. 1991.

*Primary Examiner*—Martin Angebranndt
*Attorney, Agent, or Firm*—Laubscher & Laubscher; R. J. Lasker

[57] ABSTRACT

An improvement in production of an optical recording medium of phase change type is provided. In the present method, the step of repeated recording and erasing which had to be carried out after initialization and before shipment in the conventional process is eliminated. The optical recording medium produced by the present process retain good properties after repeated overwriting. In the process of the present invention, the prior art initialization step is replaced by modification treatment and the subsequent crystallization treatment. The modification treatment is a step wherein non-crystalline recording layer formed by sputtering is melted and cooled to change the crystal-lographic state into a non-crystalline state which is different from the non-crystalline state immediately after the formation of the recording layer. The crystallization treatment is a step conducted after the modification treatment wherein the recording layer in non-crystalline state is heated for crystallization.

4 Claims, 8 Drawing Sheets

METHOD FOR PREPARING OPTICAL RECORDING MEDIUM

BACKGROUND OF THE INVENTION

1. Field of the Invention

This invention relates to a method for preparing an optical recording medium of phase change type, and more specifically, to a method for initializing such optical recording medium.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystallographic state whereupon a change of reflectivity by the crystallographic change is detected for reproduction of the information. Optical recording media of the phase change type are of great interest since they can be overwritten by modulating the intensity of a single light beam and the optical system of the drive unit used for their operation is simple as compared with magneto-optical recording media.

Most optical recording media of the phase change type used Ge-Te systems which provide a substantial difference in reflectivity between crystalline and amorphous states and have a relatively stable amorphous state. It was also recently proposed to use new compounds known as chalcopyrites.

Chalcopyrite compounds were investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228.

Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Laid-Open No. (JP-A) 240590/1991, 99884/1991, 82593/1991, 73384/1991, and 151286/1992.

In addition to these phase change type optical recording media using chalcopyrite compounds, JP-A 267192/1992, 232779/1992, and 166268/1994 disclose phase change type optical recording media wherein an AgSbTe$_2$ phase forms when a recording layer crystallizes.

In the conventional optical recording medium of phase change type, the recording layer has been formed by such means as vacuum deposition apparatus, and the recording layer immediately after its formation is in non-crystalline state. When the disc having such recording layer is utilized for a rewritable medium, crystallization of the recording layer is generally required and such crystallization is accomplished by a process called initialization.

Various processes have been proposed for the initialization. Typical processes are the process wherein the substrate is heated to crystallization temperature of the recording layer after the deposition of the recording layer (JP-A 3131/1990); the process called "solid phase initialization" wherein the recording layer is crystallized after its deposition by laser beam irradiation (JP-A 366424/1992, 201734/1990, and 76027/1991); a process wherein the substrate having the recording layer deposited thereon is irradiated with a flash light to utilize optical properties of the chalcogen compounds for pseudo-crystallization of the recording layer by photodarkening (JP-A 281219/1992); a process wherein the recording layer is crystallized by means of RF induction heating; a process wherein the substrate is heated simultaneously with the deposition of the recording layer for crystallization (JP-A 98847/1990); a process wherein a dielectric layer is formed as the first layer, and the recording layer is formed on the first layer and heated for crystallization, and the second dielectric layer is formed on the crystallized recording layer (JP-A 5246/1990).

Initialization by laser beam irradiation, however, is a time-consuming process and this process also suffer from insufficient productivity. On the other hand, the process involving the heating of the entire medium prohibited use of inexpensive resin substrates, since the heating during the initialization resulted in deformation of the resin substrate to result in tracking problems. Use of flash light required repeated irradiation to accomplish the crystallization, and productivity was insufficient.

In view of such situation, an apparatus called "bulk eraser" is currently used for the initialization in commercial scale production. A bulk eraser is an apparatus which is capable of irradiating a high power gas laser 6r semiconductor laser beam without tight focusing so that multiple tracks can be crystallized at once. Use of such bulk eraser enables localized heating of the recording layer, and temperature elevation of the substrate is thus avoided to enable the use of a resin substrate of low heat resistance.

In the conventional optical recording medium of phase change type, the medium initialized with a bulk eraser had to be subjected to a step called "priming" before its shipment. The "priming" is a step wherein recording and erasing are repeated for several ten times. The reason for conducting such "priming" is described by referring to FIG. 1B.

Figure 1A:
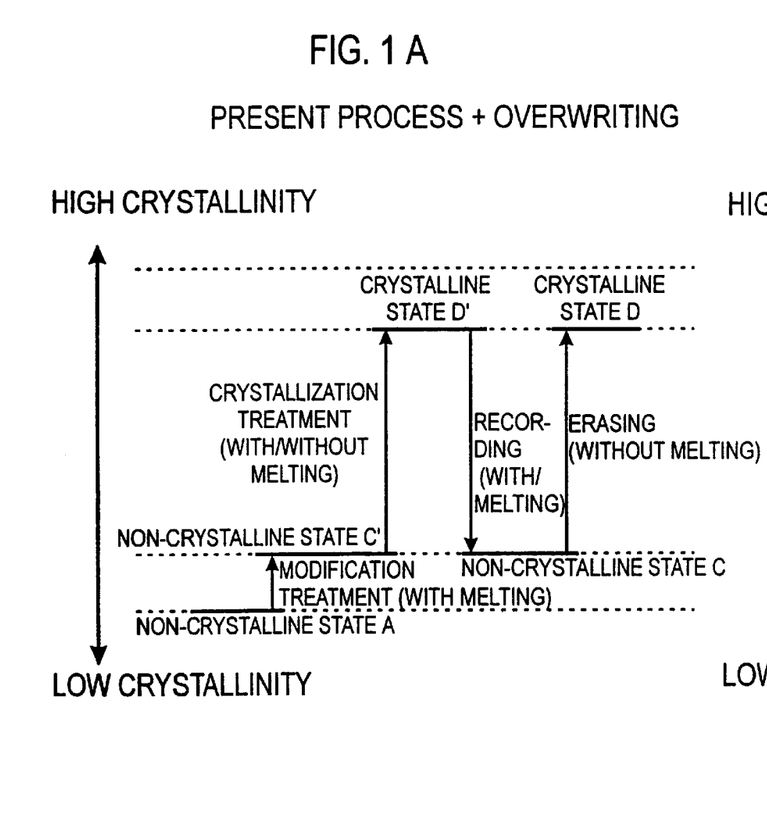
FIG. 1A is a schematic view showing the process of the present invention.
Figure 1B:
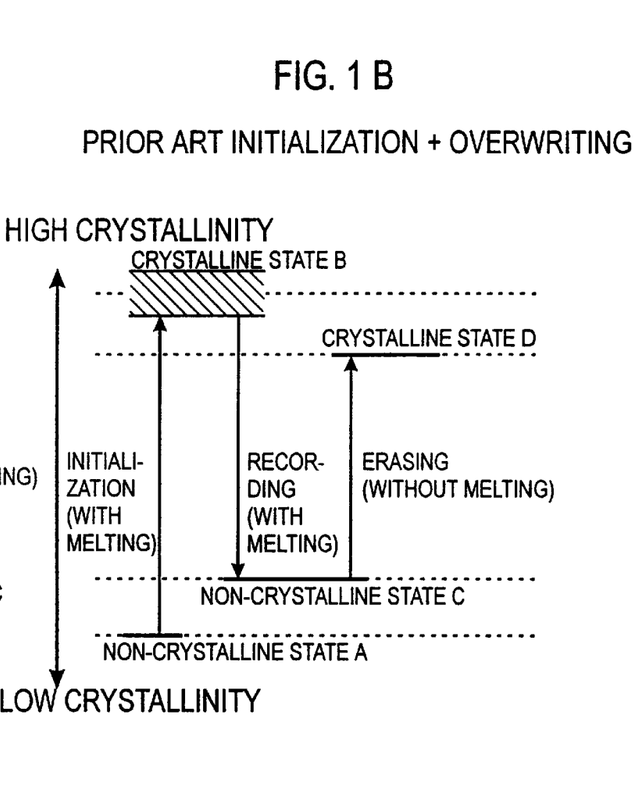
FIG. 1B is a schematic view showing the prior art initialization.

FIG. 1B is a schematic view showing crystallinity of the recording layer of phase change type at the stages of immediately after the layer formation, after the initialization, and after the overwriting. In FIG. 1B, crystallinity is represented by the ordinate axis.

The recording layer formed by sputtering is in non-crystalline state. This state is designated non-crystalline state A. When the recording layer of this state is initialized by the conventional method, the recording layer is crystallized. In the conventional initialization, the recording layer is heated for melting, and then allowed to cool slowly. The resulting post-initialization state is designated "crystalline state B". When the thus initialized recording layer is subjected to recording, the recording layer is heated to a temperature near its melting point, and quenched to leave a recording mark in non-crystalline state. Such state is designated "non-crystalline state C". After such recording, the recording layer is heated to a temperature above the crystallization temperature but below the melting temperature for crystallization of the recording mark. This is the erasing upon overwriting. Such post-erasing state is designated "crystalline state D".

In FIG. 1B, the post-initialization crystalline state B and the post-erasing crystalline state D shares the common feature that they are in their crystalline state. The post-initialization crystalline state B and the post-erasing crystalline state D, however, are different in crystallinity, and the crystallinity of the post-initialization crystalline state B is higher than that of the post-erasing crystalline state D. More illustratively, the post-initialization crystalline state B attained by crystallization after melting has a crystal grain size larger than that of the post-erasing crystalline state D attained by crystallization without melting. Such difference in the crystallinity between the region crystallized in the initialization and the region crystallized in the overwriting results in the difference of reflectivity, and it is only after overwriting the entire region of the medium that the reflectivity becomes consistent. In the mark edge recording as used in the overwritable DVD-RAM, such inconsistency in the reflectivity invites misrecognition of the mark edge.

The step of "priming" is conducted to clear such difference in crystallinity between the region crystallized by the initialization and the region crystallized by the erasing.

The "priming", however, is a quite time-consuming process, and productivity is greatly sacrificed by such "priming".

Initialization of the conventional method also suffers from various problems associated with the use of bulk eraser.

A 12 cm optical recording disk usually takes about several ten seconds to several minutes for its initialization with a bulk eraser, and therefore, the process of initialization is the rate-determining step in the production of the optical recording disk.

In the initialization with a bulk eraser, many tracks are initialized at once by using a high power laser beam, and the problems as described below are involved with such bulk initialization.

In such initialization with the bulk eraser, the laser beam is not tightly focused and a beam spot of substantial area is formed. The energy density within the beam spot, however, is not consistent. In addition, in the spiral scanning of the optical recording medium with the beam spot during the initialization, there is some overlap between the annular region scanned by the beam spot in one turn and the annular region scanned in the next turn. Consequently, the reflectivity after the initialization is different from track to track, and the step of "priming" was necessary to clear such difference in the reflectivity, and the inconsistent reflectivity also resulted in the focus servo failure of the driving unit during the "priming". It should also be noted that, in the prepit region of the substrate where unoverwritable pits are preliminarily formed, the reflectivity inconsistency resulting from the initialization can not be cleared by the process of "priming", and the prepit region may have some difficulty in servo and reproduction. In FIG. 1B, the inconsistency in the reflectivity is represented by the hatched region with considerable variation in the degree of crystallinity.

As mentioned above, the beam spot of a bulk eraser is of substantial area, and only limited energy is applied to each track compared to the total beam energy. Typical countermeasures are repeated irradiation of the same track and increase in the laser beam power, which resulted in damages of the recording layer and/or the dielectric layers sandwiching the recording layer, reduced number of overwritable operations, and inconsistent reflectivity. The stress applied to the dielectric layers upon the melting of the recording layer in the course of bulk initialization is larger than the case of single track initialization since multiple tracks, namely, larger area is initialized in the case of the initialization with a bulk eraser. Therefore, the damages of the recording layer and/or the dielectric layers in the case of the initialization with a bulk eraser is serious, and this damage results in the inconsistent reflectivity. In addition, degree of the damage would be different from track to track due to the inconsistent beam intensity within the beam spot and the beam spot overlap as mentioned above. The inconsistency of the reflectivity caused by such damage can not be completely compensated by the process of "priming", and the resulting inconsistency of the reflectivity within the crystallized regions will invite increased jitter and servo failure of the driving unit.

SUMMARY OF THE INVENTION

An object of the present invention is to provide a method for producing an optical recording medium of phase change type wherein the step of repeated recording/erasing of the initialized medium that had been required before the shipment in the conventional process can be omitted. Another object of the present invention is to provide a method for producing a phage change optical recording medium wherein good recording properties are retained after repeated overwriting operations.

Such objects of the present invention are attained by any one of the following (1) to (4).

(1) A method for preparing an optical recording medium comprising a substrate and a recording layer of phase change type, comprising the steps of     modification treatment wherein the recording layer in non-crystalline state formed by sputtering is melted and cooled to change the crystallographic state into a non-crystalline state which is different from the non-crystalline state immediately after the formation of the recording layer, and     a step of crystallization treatment wherein the recording layer in its non-crystalline state is heated for crystallization, said crystallization treatment being conducted after the modification treatment.

(2) The method for preparing an optical recording medium according to (1) wherein said modification treatment is conducted by irradiating the recording layer immediately after its formation with a pulse-modulated laser beam.

(3) The method for preparing an optical recording medium according to (1) wherein said recording layer contains Ge, Sb and Te.

(4) The method for preparing an optical recording medium according to (1) wherein said recording layer contains Ag, In, Sb and Te.

As described above, the step of "priming" was necessary because of the difference between the crystallinity immediately after the initialization and the crystallinity of the crystallized region after repeated overwriting. In addition, the reflectivity inconsistency caused by the damage of the as-deposited non-crystalline recording layer during the bulk crystallization of with the bulk eraser could not be remedied by the step of "priming".

In order to eliminate the step of "priming" which has been greatly detrimental to the productivity of the optical recording medium and avoid the reflectivity inconsistency which can not be remedied by the step of "priming", non-crystalline state A (the state immediately after the deposition of the recording layer) should be brought into crystalline state D without melting the recording layer. In other words, non-crystalline state A (the state immediately after the deposition of the recording layer) should be directly brought into crystalline state D (the state after erasing) without undergoing crystalline state B (the state after the conventional initialization). Non-crystalline state A resulting from the sputtering has a randomness higher than the amorphized non-crystalline state C after the recording, and irradiation of a higher power laser beam for a longer period is necessary to change non-crystalline state A directly into crystalline state D without melting the recording layer, and such direct phase change is impractical.

The process of the present invention is shown in FIG. 1A in contrast to the conventional process of FIG. 1B.

In the process of the present invention, non-crystalline state A immediately after the deposition of the recording layer is first changed into non-crystalline state C' which has a randomness substantially equivalent with non-crystalline state C of the recording mark formed by the conventional course of initialization followed by the recording. Such change from non-crystalline state A into non-crystalline state C', the state which is non-crystalline as in the case of non-crystalline state A but with a randomness different from that of non-crystalline state A, is achieved by a modification treatment wherein the recording layer is heated and then quenched.

Next, the recording layer is subjected to crystallization treatment by heating the recording layer of non-crystalline state C' into crystalline state D' having a crystallinity substantially comparable to crystalline state D after erasing. Non-crystalline state C' after the modification treatment has a crystal randomness substantially comparable to non-crystalline state C of the recording mark, and therefore, crystallization from non-crystalline state C' into crystalline state D' only requires irradiation of a low power laser beam for a short period as in the case of the conventional erasing process. In this crystallization treatment, the recording layer may be crystallized either by melting the recording layer or by retaining the solid phase without melting the recording layer.

In the present invention, the modification treatment and the subsequent crystallization treatment are conducted instead of the conventional initialization step. The thus treated recording layer (of crystalline state D') has a crystallinity equivalent to the crystallinity after repeated overwriting (crystalline state D). Therefore, the step of "priming" which has been critical in the conventional production process is no longer necessary, and the productivity is greatly improved.

As described above, it has been necessary in the conventional initialization process to repeatedly irradiate the same track by using the bulk eraser and/or to increase the power of the laser beam of the bulk eraser, and such initialization invited damages of the recording layer and/or the dielectric layers sandwiching the recording layer, reduced number of overwritable operations, and variation in reflectivity. In contrast to such initialization process, damage by heat during the modification treatment of the present invention is markedly small since the recording layer is allowed to cool at a higher rate because of the use of a pulse-modified laser beam or a laser beam with an increased linear velocity in the modification treatment of the non-crystalline state A into the non-crystalline state C' (The level of the power required for the modification treatment is the same as the conventional initialization). Therefore, in spite of the use of the bulk eraser for the modification treatment, the recording layer and the dielectric layers are protected from being damaged, and the optical recording medium produced by the process of the present invention will no longer suffer from the reflectivity inconsistency that can not be remedied by the step of "priming".

BRIEF DESCRIPTION OF THE DRAWINGS

These and further features of the present invention will be apparent with reference to the following description and drawings, wherein:

FIGS. 7A and 7B are photographs of oscillograph. FIG. 7A shows fluctuation of reflectivity for 1 track of the optical recording medium produced in accordance with the present invention, and FIG. 7B shows fluctuation of reflectivity for 1 track of the optical recording medium initialized by the prior art method.

BEST MODE FOR CARRYING OUT THE INVENTION

Next, the embodiments of the present invention are described in detail.

Modification and Crystallization Treatments

In the present invention, a recording layer of phase change type is formed by sputtering as in the case of conventional production process. The resulting recording layer is in non-crystalline state [Non-crystalline state A in FIG. 1A].

Next, the recording layer is modified. In this modification treatment, the recording layer is melted and cooled to change the non-crystalline state A into a non-crystalline state different from the non-crystalline state A [Non-crystalline state C' in FIG. 1A].

The process used for melting the recording layer in this modification treatment is not limited to any particular process, and any process capable of changing the non-crystalline state A into the non-crystalline state C' may be employed. A typical process is irradiation of pulse-modulated laser beam. Use of a bulk eraser is preferred in view of the high productivity as in the case of conventional initialization, and in the present invention, the optical recording medium may be irradiated with a pulse-modulated laser beam of the bulk eraser. Since the laser beam energy is partly cut off by pulse modulation, the non-crystalline state C' is easily achieved with no damages in the recording layer or the dielectric layers even when the modification treatment is conducted with the bulk eraser at a linear velocity equivalent with the conventional initialization.

Frequency of the pulse modulation is not limited to any particular range. Optimal frequency of the pulse modulation is different depending on the laser power, linear velocity of the laser beam and other conditions, and therefore, the pulse modulation frequency may be experimentally determined to attain the reflectivity corresponding to the non-crystalline state C'. The laser beam irradiated generally has a pulse modulation frequency of at least 1 MHz, preferably at least 5 MHz, and more preferably at least 8 MHz. Although no particular upper limit is set for the pulse modulation frequency, it is generally difficult to use a pulse modulation frequency exceeding 10 MHz in an apparatus of relatively high power like the bulk eraser.

In the case of using a pulse-nonmodulated laser beam, a laser beam of high power may be used at a high linear velocity and at a high cooling rate. Preferable ranges for the power and the linear velocity of the laser beam may vary with the diameter of the laser beam and the composition of the recording layer, and therefore, may be determined by experiments.

After the modification treatment, the optical recording medium is subjected to a crystallization treatment wherein the recording layer is heated for crystallization into the crystalline state [Crystalline state D']. In this crystallization treatment, the recording layer is heated to a temperature higher than the crystallization temperature. It should be noted that, in this crystallization treatment, the recording layer may be crystallized either by melting the recording layer, or by heating the recording temperature to a temperature below the melting temperature so that the crystallization would proceed in solid phase.

The conditions for the crystallization treatment are not particularly limited, and the crystallization conditions may be determined through experiments to attain the reflectivity corresponding to the non-crystalline state D'.

Figure 2:
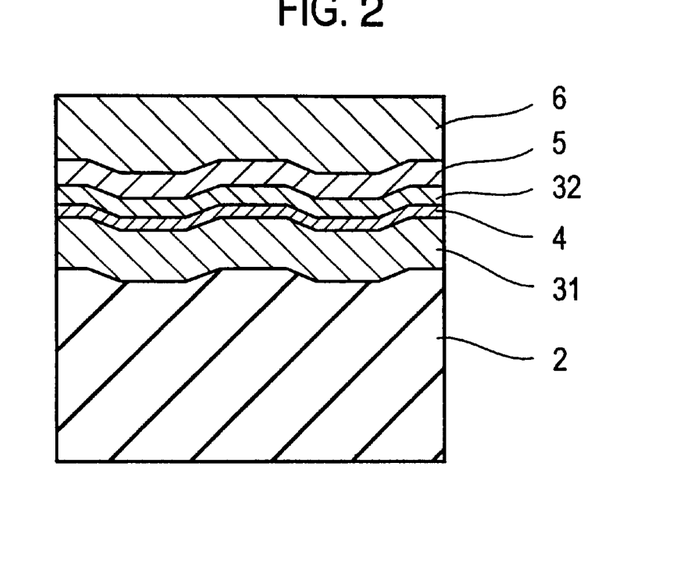
FIG. 2 is a schematic partial cross-sectional view of the optical recording medium according to an embodiment of the present invention.

Structure of the Medium of FIG. 2

Referring to FIG. 2, there is illustrated a typical configuration of the optical recording medium according to an embodiment of the present invention. The optical recording medium has a first dielectric layer 31, a recording layer 4, a second dielectric layer 32, a reflective layer 5, and a protective layer 6 on a substrate 2.

Substrate

Since the optical recording medium is adapted to be recorded and read by directing a light beam to the recording layer 4 through the substrate 2, the substrate 2 is preferably formed of a material substantially transparent to such a light beam, for example, resins and glass. Typical resins are acrylic resins, polycarbonate, epoxy resins and polyolefins. The shape and dimensions of the substrate are not critical although it is generally of disc shape having a diameter of about 50 to 360 mm and a thickness of about 0.5 to 3 mm. The substrate surface may be provided with a predetermined pattern of grooves for tracking and addressing purposes.

Dielectric Layers

The first dielectric layer 31 plays the role of preventing oxidation of the recording layer 4 and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transfer. Further, the provision of both the dielectric layers is effective for improving a degree of modulation.

The dielectric layer used for the first and the second dielectric layer is not limited to any particular type, and various dielectric materials or a mixture thereof as well as various transparent ceramics such as silicon oxide, silicon nitride and ZnS—SiO$_2$ and various species of glass may be used. Also useful are so-called LaSiON materials containing La, Si, O, and N, so-called SiAlON materials containing Si, Al, O, and N, SiAlON containing yttrium, etc.

In the present invention, at least one of the first and the second dielectric layers may preferably contain zinc sulfide, ZnS for optimization of properties such as refractive index. The dielectric layer containing zinc sulfide is hereinafter referred to as ZnS-containing dielectric layer. The ZnS-containing dielectric layer may preferably contain an element whose standard free energy of sulfide formation is lower than the standard free energy of ZnS formation at 0 to 1000° C. (hereinafter referred to as metal element A). Incorporation of the metal element A in the ZnS-containing dielectric layer results in the suppressed release of sulfur upon repeated overwriting, and increase of jitter is thereby prevented. This results in the increased number of overwritable operations.

The metal element A is preferably at least one member selected from Ce, Ca, Mg, Sr, Ba and Na, and use of Ce is most preferable in view of the low standard free energy of sulfide formation. For example, at 300K, the standard free energy of ZnS formation is about −230 kJ/mol, the standard free energy of CeS formation is about −540 kJ/mol, the standard free energy of CaS formation is about −510 kJ/mol, the standard free energy of MgS formation is about −390 kJ/mol, the standard free energy of SrS formation is about −500 kJ/mol, the standard free energy of BaS formation is about −460 kJ/mol, and the standard free energy of Na$_2$S formation is about −400 kJ/mol.

In the znS-containing dielectric layer, the ratio of the metal element A to the total metal elements is less than 2 at %, preferably 1.5 at % or less, and more preferably 1.3 at % or less. When the ratio of the metal element A is in excess of such range, the effect of suppressing jitter increase upon repeated overwriting is not realized. It should be noted that the ratio of the metal element A is preferably at least 0.01 at %, and more preferably at least 0.03 at % for sufficient realization of the metal element A addition. The ratio of the metal element A to the total metal elements may be determined by fluorescent X-ray analysis or EPMA (electron probe X-ray microanalysis). It should be noted that semi-metal such as silicon is included in the "total metal elements" in the dielectric layer.

The metal element A in the dielectric layer may take form of simple substance, sulfide, oxide, fluoride, or the like.

The ZnS-containing dielectric layer may preferably contain compounds other than zinc sulfide, for example, an oxide, nitride or fluoride. Preferably, such compound is at least one member selected from silicon oxides (SiO$_2$, SiO), tantalum oxide (Ta$_2$O$_5$), titanium oxide (TiO$_2$), lanthanum oxide (La$_2$O$_3$), silicon nitride (Si$_3$N$_4$), aluminum nitride (AlN), magnesium fluoride (MgF$_2$), sodium fluoride (NaF) and thorium fluoride (ThF$_4$). When the dielectric layer is prepared from zinc sulfide alone, the dielectric layer is excessively hard, and heat impacts in the overwriting operations may result in delamination of the dielectric layer, leading to poor rewriting durability. Inclusion of silicon oxide, silicon nitride or the like invites improvement in the rewriting durability.

The content of the zinc sulfide in the ZnS-containing dielectric layer is preferably in the range of from 50 to 95 mol %, and more preferably from 70 to 90 mol %. When the content of the zinc sulfide is insufficient, heat conductivity will be too high and refractive index will be too low, and high C/N can not be obtained. On the other hand, an excessively high zinc sulfide content results in poor rewriting durability. The content of the zinc sulfide in the dielectric layer is calculated in terms of sulfur and zinc contents measured by fluorescent X-ray analysis or the like, and for example, when the zinc content measured is in excess of the sulfur content, the excess zinc is deemed to be present in the form of a compound other than zinc sulfide, for example, ZnO.

An embodiment wherein the metal element A is added to the ZnS-containing dielectric layer has been described in the foregoing. Alternatively, an intermediate layer containing the metal element A may be disposed between the ZnS-containing dielectric layer and the recording layer. Examples of such intermediate layer include the layer containing cerium oxide ($CeO_2$) as simple substance, and the layer containing a mixture of ZnS—$CeO_2$ mixture.

When either one of the first and the second dielectric layers is the ZnS-containing dielectric layer, the dielectric material used for the other dielectric layer, namely, the dielectric layer containing no ZnS is not limited to any particular type, and the dielectric materials as mentioned above other than the zinc sulfide or a mixture thereof may be used.

The lower and the upper dielectric layers may preferably have a refractive index of at least 1.4, especially at least 1.8 in the wavelength range of 400 to 850 nm. This wavelength range covers 780 nm which is the wavelength used in current CD players and 630–680 nm which is a candidate wavelength of the next generation recording technology and represents the range over which the optical recording medium having the recording layer as described below is advantageously operated.

The first dielectric layer 31 is preferably about 50 to 300 nm thick, more preferably 100 to 250 nm thick. Within this thickness range, the first dielectric layer is effective for preventing any damage to the substrate upon recording and higher degree of modulation is available. The second dielectric layer 32 is preferably about 10 to 30 nm, more preferably about 13 to 20 nm thick. This thickness range ensures a fast cooling rate and thus permits to define a record mark with a clear edge, resulting in reduced jitter. Also higher degree of modulation is available.

The dielectric layers are preferably formed by vapor exposition such as sputtering and evaporation, and the metal element A may be incorporated in the dielectric layer by various methods. For example, when the metal element A is cerium, a chip comprising cerium as simple substance or $CeO_2$ may be placed on the main target comprising the main components of the dielectric layer, or alternatively, cerium may be incorporated in the main target in the form of $CeO_2$ or other Ce compounds. When calcium or magnesium is used for the metal element A, it is possible to place a chip comprising CaO or MgO. Such oxides, however, have deliquescence, and use of such chip is undesirable. In such a case, a chip comprising $CaF_2$ or $MgF_2$ may be placed on the main target. The situation is similar when strontium, barium, sodium and the like are used for the metal element A, and use of fluoride chip is more preferable than oxide chip in view of the deliquescence. Alternatively, calcium, magnesium, strontium, barium, and sodium may be incorporated in the main target in the form of oxide or other compounds. The main target may comprise a multi-component target such as ZnS—$SiO_2$, or alternatively, ZnS and $SiO_2$ may be separately used for the main targets in simultaneous sputtering.

The ZnS-containing dielectric layer may be deposited by conventional sputtering in argon atmosphere. However, when the metal element A as described above is incorporated in the ZnS-containing dielectric layer, the sputtering is preferably effected in a mixed atmosphere of argon and oxygen. The sputtering in such mixed atmosphere enhances the effect of suppressing jitter increase upon repeated overwriting. Introduction of the oxygen into the sputtering atmosphere is particularly effective when the sputtering is conducted by placing the chip comprising the metal element A as simple substance on the main target, but such oxygen introduction is also effective when the sputtering is conducted by placing the chip comprising the compound of the metal element A on the main target or by incorporating the compound of the metal element A in the main target. The amount of oxygen introduced into the sputtering atmosphere in terms of partial pressure ratio $O_2/(Ar+O_2)$ is preferably 30% or less, and more preferably 25% or less. Excessive introduction of the oxygen is undesirable since the recording power decreases with no difference in the erasing power, and the erasing power margin would be extremely narrow. The oxygen is preferably introduced to a partial pressure ratio of 5% or higher, and more preferably, to a partial pressure ratio of 10% or higher in order to fully enjoy the effects of oxygen introduction.

Recording Layer

The composition of the recording layer is not critical as long as the modification and crystallization treatments as described above can be effected instead of the conventional initialization. However, the present invention is effective when the optical recording medium has a recording layer of In—Ag—Te—Sb system or Ge—Sb—Te system, and in particular, when the optical recording medium has a recording layer of In—Ag—Te—Sb system.

In—Ag—Te—Sb system

In the recording layer of indium (In)-silver (Ag)-tellurium (Te)-antimony (Sb) system, the atomic ratio of indium, silver, tellurium, and antimony is preferably represented by the formula (I):

$$\{(In_aAg_bTe_{1-a-b})_{1-c}Sb_c\}_{1-d}M_d \qquad (I)$$

wherein letters a, b, c and d are in the range: $0.1 \leq a \leq 0.3$, $0.1 \leq b \leq 0.3$, $0.5 \leq c \leq 0.8$, and $0 \leq d \leq 0.05$, more preferably in the range: $0.11 \leq a \leq 0.28$, $0.15 \leq b \leq 0.28$, $0.55 \leq c \leq 0.65$, and $0.005 \leq d \leq 0.05$.

If the value of a is too small in formula (I), the indium content of the recording layer will be relatively too low and record marks will become less amorphous, resulting in a lower degree of modulation and lower reliability. If the value of a is too large, the indium content of the recording layer will be relatively too high and the reflectivity of regions other than record marks will become low, resulting in a lower degree of modulation.

If the value of b is too small in formula (I), the silver content of the recording layer will be relatively too low and the recrystallization of record marks and hence, repetitive overwriting will become difficult. If the value of b is too large, the silver content of the recording layer will be relatively too high and excess silver will solely diffuse into the antimony phase during the recording and erasure. This results in lower rewriting durability, less stability of both the record marks and the crystalline regions, and a loss of reliability. Specifically, when the medium is stored at elevated temperature, record marks crystallize more to invite drops of C/N and degree of modulation. Additionally, the deterioration of C/N and degree of modulation caused by repetitive recording is promoted.

If the value of a+b is too small in formula (I), tellurium will become excessive to form a tellurium phase, which lowers the rate of crystal transition to hinder erasure. If the value of a+b is too large, it would become difficult to make the recording layer amorphous and it would become impossible to record signals.

If the value of c is too small in formula (I), change of reflectivity associated with a phase change will be sufficient, but erasure would be difficult due to markedly reduced rate of crystal transition. If the value of c is too large, change of reflectivity associated with a phase change will be insufficient to invite drop of degree of modulation.

The element M in formula I is at least one element selected from the group consisting of H, Si, C, V, W, Ta, Zn, Ti, Ce, Tb, and Y. The element M is effective for improving rewriting durability, more specifically restraining the rate of erasure from lowering as a result of repetitive rewriting. It is also effective for improving reliability under severe conditions such as hot humid conditions. At least one of V, Ta, Ce and Y is preferred among the elements M because their effects are more outstanding. V and/or Ta is more preferred, with V being most preferred.

If the value of d which stands for the content of element M is too large, change of reflectivity associated with a phase change becomes too small to provide a sufficient degree of modulation. If the value of d is too small, effect of the addition of the element M will be insufficient.

Although it is preferred that the recording layer consists essentially of silver (Ag), antimony (Sb), tellurium (Te), indium (In), and optionally added M, it is acceptable that the silver is partially replaced by gold (Au); the antimony is partially replaced by bismuth (Bi); the tellurium (Te) is partially replaced by selenium (Se); and the indium (In) is partially replaced by aluminum (Al) and/or phosphorus (P).

The percent replacement of Ag by Au is preferably up to 50 at %, more preferably up to 20 at %. With a higher percent replacement, record marks are likely to crystallize, leading to a loss of reliability at elevated temperature.

The percent replacement of Sb by Bi is preferably up to 50 at %, more preferably up to 20 at %. With a higher percent replacement, the recording layer would have an increased coefficient of absorption. As a result, the optical interference effect and the difference in reflectivity between crystalline and amorphous regions are reduced, leading to a lower degree of modulation and a lower C/N.

The percent replacement of Te by Se is preferably up to 50 at %, more preferably up to 20 at %. With a higher percent replacement, the crystal transition would be retarded and the rate of erasure be reduced.

The percent replacement of In by Al and/or P is preferably up to 40 at %, more preferably up to 20 at %. With a higher percent replacement, record marks would become less stable with a resultant loss of reliability. The proportion of Al and P is arbitrary.

It is noted that the recording layer of this composition system after repetitive rewriting has a coefficient of absorption k of about 3.3 in the crystalline state and about 2.2 in the microcrystalline or amorphous state.

The recording layer of this composition system preferably has a thickness of about 9.5 to 50 nm, and more preferably, a thickness of about 13 to 30 nm. A too thin recording layer would restrain the growth of a crystalline phase and provide an insufficient change of reflectivity associated with a phase change. A too thick recording layer would invite silver diffusion of an increased amount in the thickness direction of the recording layer upon formation of the recording mark which in turn results in the silver diffusion of a reduced amount in the direction of the recording layer, and the resulting recording layer would be less reliable. A too thick recording layer would also provide a lower reflectivity and a lower degree of modulation.

Ge—Sb—Te System

In the recording layer of germanium (Ge)-antimony (Sb)-tellurium (Te) system, the atomic ratio of germanium, antimony and tellurium is preferably represented by the formula (II):

$$Ge_a Sb_b Te_{1-a-b} \tag{II}$$

wherein letters a and b are in the range: $0.08 \leq a \leq 0.25$ and $0.20 \leq b \leq 0.40$.

If the value of a is too small in formula (II), record marks are more unlikely to crystallize and the rate of erasure would be lower. If the value of a is too large, much tellurium would bond with germanium with the resultant precipitation of antimony, inhibiting formation of record marks.

If the value of b is too small, the content of tellurium would be too much and record marks are more likely to crystallize when the medium is stored at elevated temperature with a loss of reliability. If the value of b is too large, antimony would precipitate to inhibit formation of record marks.

The recording layer of this composition system preferably has a thickness of about 14 to 50 nm. A too thin recording layer would restrain the growth of a crystalline phase and provide an insufficient change of reflectivity associated with a phase change. A too thick recording layer would provide a lower reflectivity and a lower degree of modulation.

The composition of the recording layer is identifiable by electron probe microanalysis (EPMA), X-ray microanalysis, ICP etc.

The recording layer is preferably formed by sputtering. The conditions for the sputtering are not critical, and when a material containing two or more elements are sputtered, the sputtering may be effected by using an alloy target or by using simultaneous sputtering employing two or more targets.

Reflective Layer

The reflective layer 5 may be formed of any desired material, typically high reflectivity metals, for example, Al, Au, Ag, Pt, and Cu alone or alloys containing at least one of these metals. The reflecting layer is preferably about 30 to 200 nm thick. Reflectivity would be insufficient with a thickness below this range. A thickness beyond this range would provide no substantial improvement in reflectivity and add to the cost. The reflecting layer is preferably formed by vapor deposition such as sputtering and evaporation.

Protective Layer

The protective layer 6 is provided for improving scratch resistance and corrosion resistance. Preferably the protective layer is formed of organic materials, typically radiation curable compounds or compositions thereof which are cured with radiation such as electron and UV radiation. The protective layer is generally about 0.1 to 100 $\mu$m thick and may be formed by conventional techniques such as spin coating, gravure coating, spray coating, and dipping.

Figure 3:
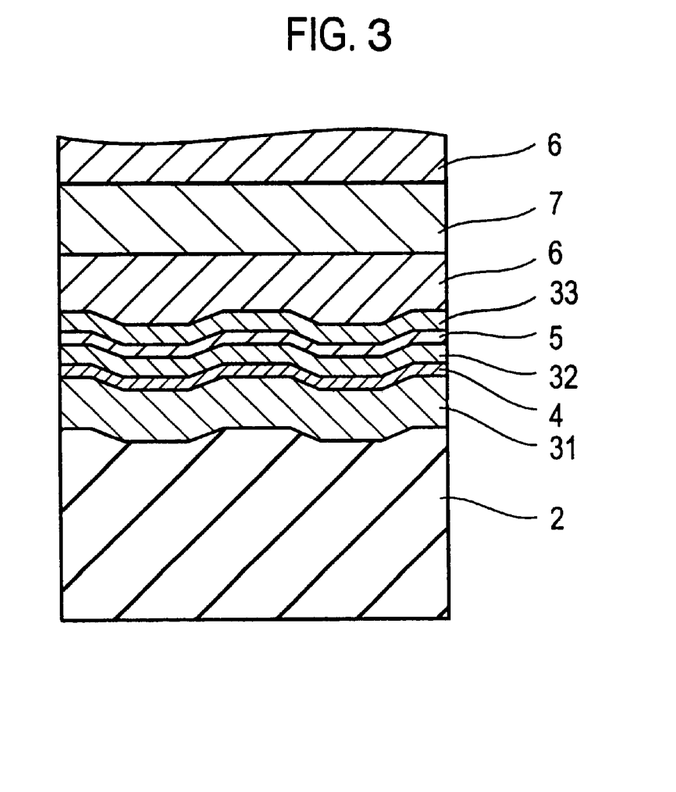
FIG. 3 is a schematic partial cross-sectional view of the optical recording medium according to another embodiment of the present invention.

Structure of the Medium of FIG. 3

Referring to FIG. 3, there is illustrated another embodiment of the optical recording medium according to the present invention. The optical recording medium of this structure has been fabricated for the purpose of suppressing increase of jitter upon overwriting, and is described, for example, in JP-A 124218/1996). This optical recording medium is a double side recording medium prepared by adhering two single side recording (single side/single layer) optical recording media each comprising first dielectric layer 31, recording layer 4, second dielectric layer 32, reflective layer 5, third dielectric layer 33, and protective layer 6 on a substrate 2. The single side recording optical recording media are adhered to each other by intervening adhesive layer 7 with the recording layer 4 on the interior side.

In the optical recording medium of FIG. 3, substrate 2, first dielectric layer 31, recording layer 4, second dielectric layer 32, and protective layer 6 are of the construction similar to the optical recording medium of FIG. 2.

The reflective layer 5 of the optical recording medium of FIG. 3 may be either a layer of high light transmittance with a thickness much less than the reflective layer of the optical recording medium of FIG. 2, or a layer comprising silicon or germanium having high transmittance for the light of near infrared to infrared region including the wave length of the laser beam. The third dielectric layer 33 disposed on the reflective layer 5 may comprise a material similar to the first and the second dielectric layers 31 and 32. The third dielectric layer 33, however, may preferably comprise a material which has a refractive index higher than that of the protective layer 6.

Rewriting

On the optical recording medium of the invention, the rewriting (overwriting) is performed in a manner similar to the phase change type optical recording medium of conventional type. The recording power may be applied in pulses. If one signal is recorded by at least two divided portions of irradiation, the heat accumulation in the record mark is suppressed. Then the dilation of the trailing edge of the record mark (known as a teardrop phenomenon) can be prevented, leading to an improved C/N. The pulse irradiation also improves the rate of erasure. The values of recording power and erasing power can be determined without undue experimentation. The reading laser beam should be of a low power so that the crystalline state of the recording layer may not be affected thereby.

When the optical recording medium of the invention is recorded, the linear velocity of the recording layer relative to the laser beam is generally about 0.8 to 20 m/s, preferably 1.2 to 16 m/s.

The light for use in the rewriting and reading of the optical recording medium of the invention may be selected in a wide wavelength range of, for example, 100 to 5,000 nm.

EXAMPLES

Examples of the present invention are given below by way of illustration and not by way of limitation.

Example 1

An optical recording disc as shown in FIG. 2 was prepared by injection molding polycarbonate into a disc shaped substrate 2 having a diameter of 130 mm and a thickness of 0.6 mm. A groove was formed in one major surface of the substrate simultaneous with the injection molding. The groove had a width of 0.74 $\mu$m, a depth of 65 nm, and a pitch of 1.48 $\mu$m. On the grooved surface of the substrate, there were formed a first dielectric layer 31, a recording layer 4, an second dielectric layer 32, a reflective layer 5, and a protective layer 6.

The first dielectric layer 31 was formed by sputtering a target of ZnS (85 mol %) and $SiO_2$ (15 mol %). The first dielectric layer 31 had a thickness of 240 nm.

The recording layer 4 was formed by sputtering to a thickness of 16 nm. The recording layer 4 was of the composition:

wherein a=0.18, b=0.19, c=0.61 and d=0.02.

The second dielectric layer 32 was formed to a thickness of 22 nm by the same procedure as the first dielectric layer 31.

The reflective layer 5 was formed to a thickness of 150 nm by sputtering an Au target.

The protective layer 6 was formed by applying a UV curable resin by spin coating and exposing it to UV for curing. The protective layer as cured had a thickness of 5 $\mu$m The thus prepared optical recording disc was subjected to the modification treatment and the crystallization treatment according to the present invention (Sample No. 101). The optical recording disc was also initialized by the prior art method (Sample No. 102).

The modification treatment of sample No. 101 was carried out at a linear velocity of 12 m/s, laser beam power of 800 mW, beam spot shift per 1 sample rotation of 60 $\mu$m, pulse modification frequency of 9 MHz, and pulse duty ratio of 50%. The crystallization treatment was carried out by placing the optical recording medium on an optical recording medium evacuator, and irradiating each track of the optical recording disc with 8 mW laser beam while rotating the disc at a linear velocity of 5 m/s. After the crystallization treatment, optimal recording power was 11.0 mW and erasing power was 4.0 mW. It should be noted that the erasing power in this case is the power at which highest erasing rate can be attained.

The initialization of sample No. 102 was carried out at a linear velocity of 3 m/s, laser beam power of 730 mW, and beam spot shift per 1 sample rotation of 66 $\mu$m. After the initialization, optimal recording power was 9.3 mW and erasing power was 4.1 mW.

Sample No. 101 after the crystallization treatment had a reflectivity of 21%, and sample No. 102 after the initialization had a reflectivity of 24%. After repeated overwriting of the signals of 1–7 RLL modulation at a linear velocity of 12 m/s, erased part (crystallized part) of both sample Nos. 101 and 102 had a reflectivity of 20%. It should be noted that the reflectivity as mentioned above is the average of all tracks. As evident from the results, the recording layer subjected to prior art initialization exhibits a reflectivity higher than the reflectivity after repeated overwriting while the recording layer subjected to the modification and crystallization treatments instead of the prior art initialization exhibits a reflectivity substantially the same as the reflectivity after repeated overwriting. The sample No. 101 treated in accordance with the process of the present invention, therefore, needs no "priming" treatment.

The samples were repeatedly overwritten as described above to evaluate leading edge jitter of 8T signal in relation to the number of repeated overwriting. The results are shown in FIG. 4.

Figure 4:
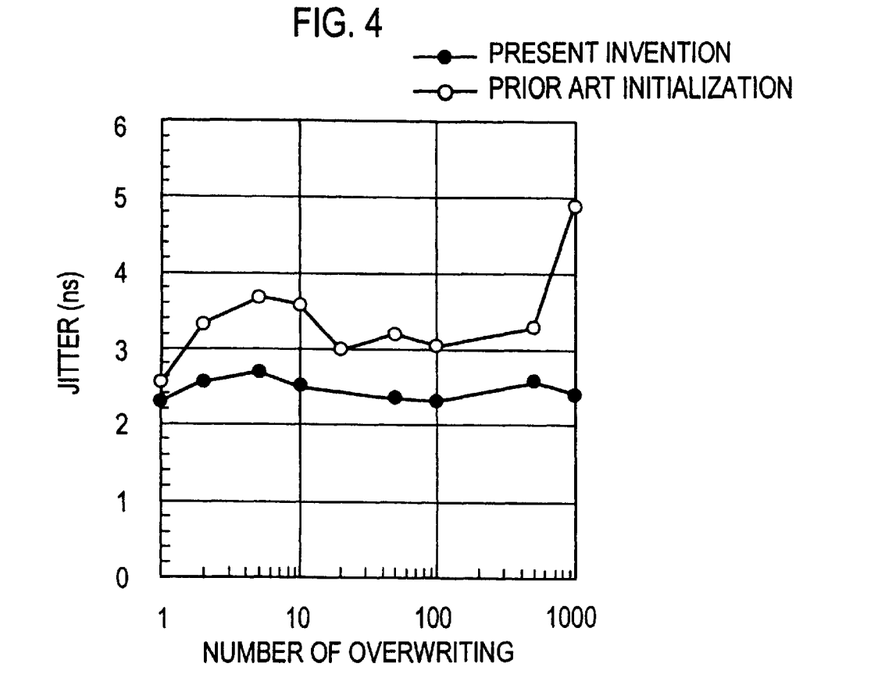
FIG. 4 is a graph showing jitter in relation to number of overwriting for the optical recording disc produced by the present invention and the optical recording disc initialized by the prior art process.

As shown in FIG. 4, in the case of the sample subjected to prior art initialization, the jitter became stabilized after undergoing first increase and decrease during the first 20 cycles of repeated overwriting. Such increase and decrease of the jitter may be regarded to correspond to the course of "priming". The jitter rapidly increased after 1,000 cycles of repeated overwriting. In contrast, the sample subjected to the modification treatment using RF pulse modulated laser beam and the crystallization treatment exhibited low and stable jitter from the first overwriting, and the jitter did not undergo rapid increase after 1,000 cycles of repeated overwriting showing the increased number of overwritable operations. In the case of the sample No. 102, it is the damages of the recording layer and the dielectric layers in the initialization that is estimated to be responsible for the high jitter observed from the first overwriting which is never reduced to the level equivalent to the sample No. 101 even after repeated overwriting.

Example 2

The optical recording discs prepared in Example 1 were subjected to modification treatment by irradiating the disc rotating at a linear velocity of 4 m/s with a laser of 700 mW pulse modulated at a duty ratio of 50%. Beam spot shift per 1 sample rotation was 60 μm.

After the modification treatment, the optical recording disc was subjected to crystallization treatment by placing the disc on an optical recording medium evacuator to irradiate every track of the disc with 8 mW laser beam while rotating the disc at a linear velocity of 5 m/s.

Figure 5:
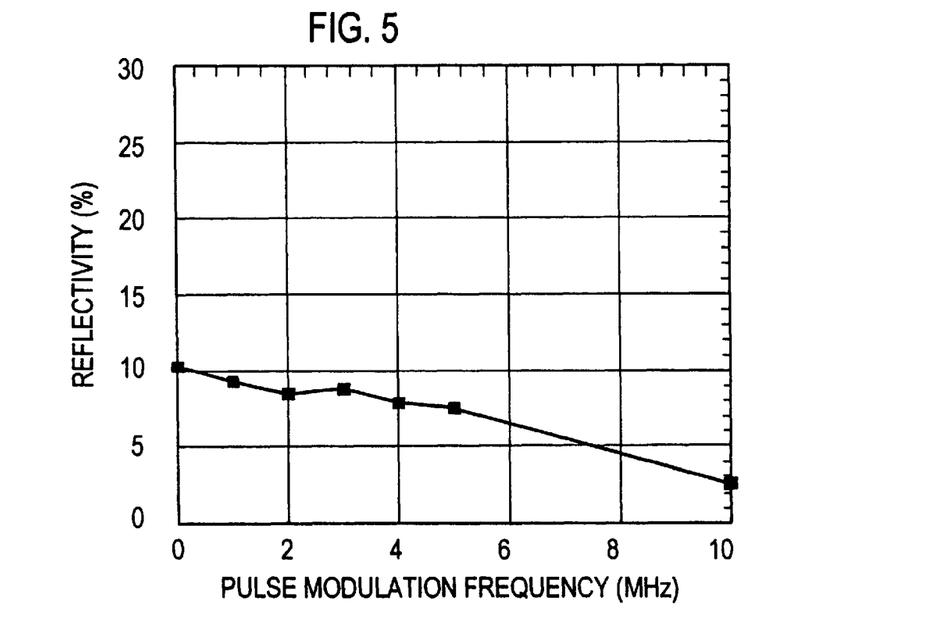
FIG. 5 is a graph showing average reflectivity after crystallization treatment in relation to pulse modulation frequency during the modulation treatment.

Average reflectivity after the crystallization treatment was calculated for the samples that had been subjected to modification treatment at different pulse modulation frequency. The average reflectivity was calculated from maximum reflectivity Rt and minimum reflectivity Rb by the following equation:

Average reflectivity=$(Rt+Rb)/2$

The reflectivity was evaluated for all tracks. The sample initialized by the prior art method was also evaluated for comparison purpose. The results are shown in FIG. 5. The sample for comparison purpose was initialized at a linear velocity of 3 m/s, laser beam power of 700 W, beam spot shift per 1 sample rotation of 60 μm. The value for such comparative sample is plotted at the position of the modulation frequency of zero.

By comparing the reflectivity upon repeated overwriting measured in Example 1 with FIG. 5, it was demonstrated that the reflectivity reduces with the increase in the pulse modulation frequency to approach the reflectivity after repeated overwriting. In other words, the crystalline state D' of FIG. 1A approaches the crystalline state D.

Figure 6:
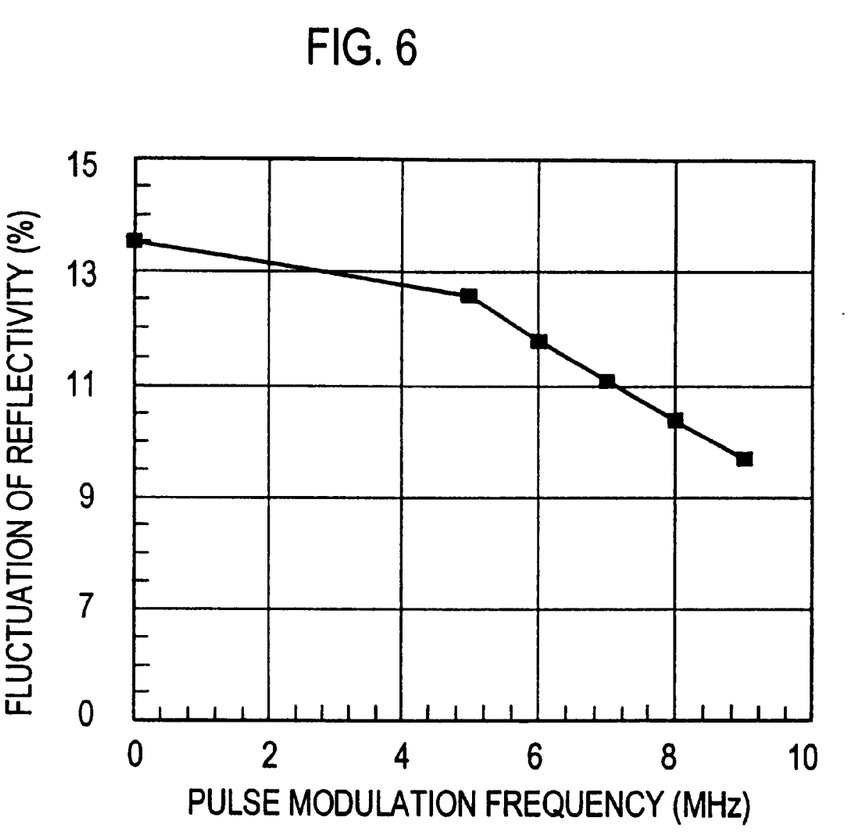
FIG. 6 is a graph showing fluctuation (%) of reflectivity after crystallization treatment in relation to pulse modulation frequency during the modulation treatment.

Fluctuation of the reflectivity after crystallization treatment was also calculated for the samples that had been subjected to modification treatment at different pulse modulation frequency. The fluctuation is determined in relation to average reflectivity by the following equation:

Fluctuation=$2(Rt-Rb)/(Rt+Rb)$

The sample initialized by the prior art method was also evaluated for comparison purpose. The results are shown in FIG. 6. The value for such comparative sample is plotted at the position of the modulation frequency of zero.

The results shown in FIG. 6 indicate that fluctuation of reflectivity reduces with the increase in the pulse modulation frequency of the laser beam, and reflectivity fluctuation of up to 10% can be realized by the pulse modulation of the laser beam.

Figure 7A:
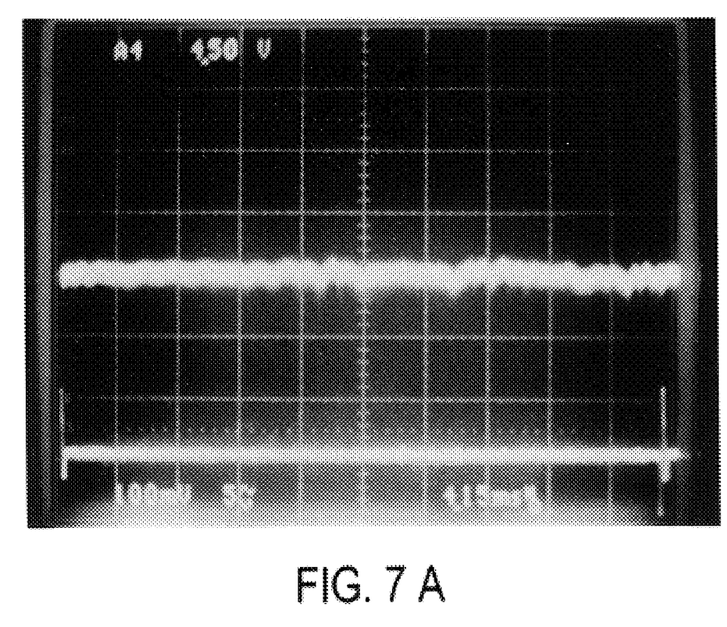
Figure 7B:
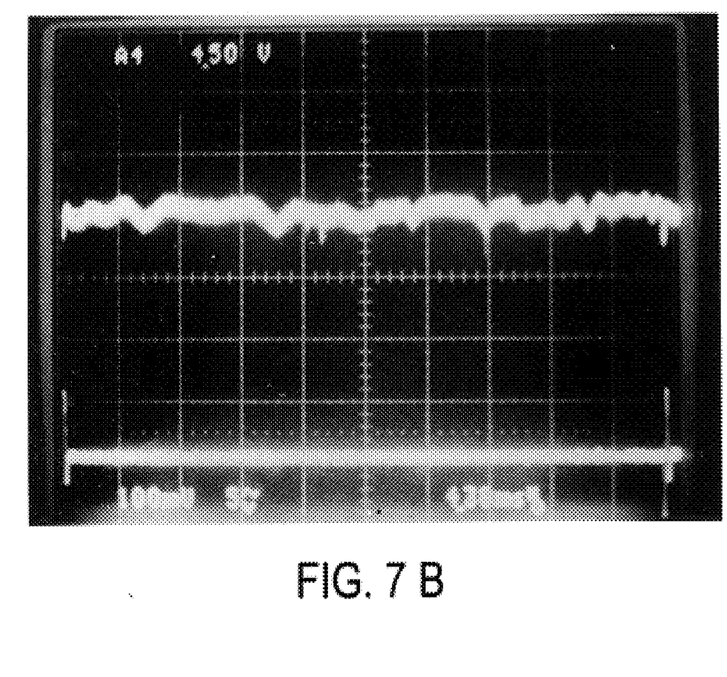

FIG. 7 is a graph showing fluctuation of reflectivity for 1 track of the optical recording disc, and the reflectivity is shown in the ordinate. FIG. 7A is the reflectivity of the optical recording disc which has been irradiated with a laser beam pulse-modulated at a frequency of 10 MHz, and FIG. 7B is the reflectivity of the above-described optical recording disc which has been initialized by the prior art method for comparison purpose. Fluctuation of the reflectivity is significantly small and gentle in FIG. 7A compared to FIG. 7B. It should be noted that the reflectivity fluctuation of FIG. 7B did not disappear after repeated writing, and the damages of the recording layer and the dielectric layers during the initialization is estimated to be responsible for such reflectivity fluctuation.

Example 3

Figure 8:
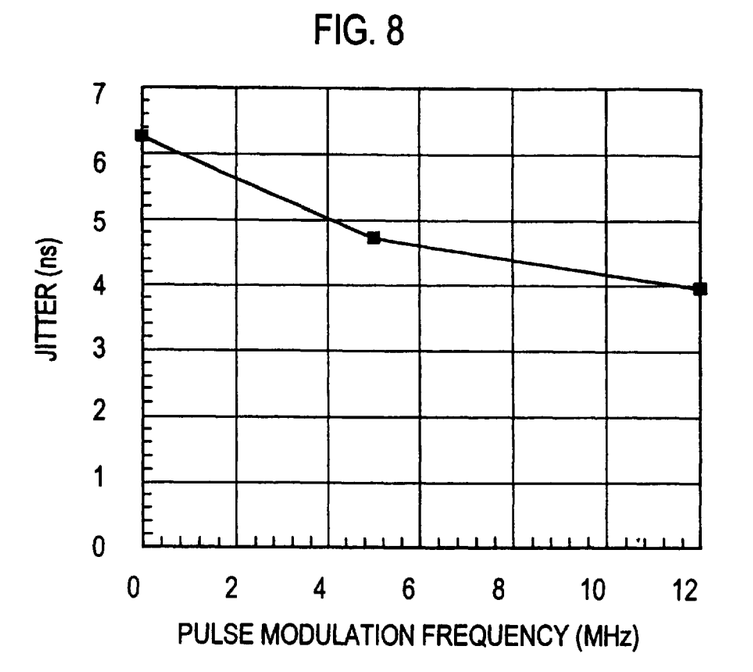
FIG. 8 is a graph showing jitter in relation to pulse modulation frequency during the modulation treatment.

The optical recording discs prepared in Example 1 were subjected to modification and crystallization treatments by repeating the procedure of Example 2 except that the pulse modulation frequency was changed as shown in FIG. 8 to prepare the samples for measurements. The samples were evaluated for their jitter by repeating the procedure of Example 1 except that the linear velocity of the disc was 6 m/s. The sample prepared for comparison purpose by conducting the prior art initialization (comparative sample of Example 2) was also evaluated for its jitter. The value for such comparative sample is plotted at the position of the modulation frequency of zero. The results are shown in FIG. 8.

The results shown in FIG. 8 indicate that the jitter can be reduced by conducting the modification and crystallization treatments of the present invention instead of the prior art initialization, and that the jitter can be reduced to a greater degree when the laser beam is pulse-modulated at a higher frequency. The comparative sample subjected to the prior art initialization exhibited a jitter in excess of 6 ns, and the disc of such jitter level is unacceptable. It should be noted that absolute value of the jitter in FIG. 8 is approximately twice that of FIG. 4 reflecting the situation that the linear velocity in FIG. 8 is half of FIG. 4.

Example 4

Figure 9:
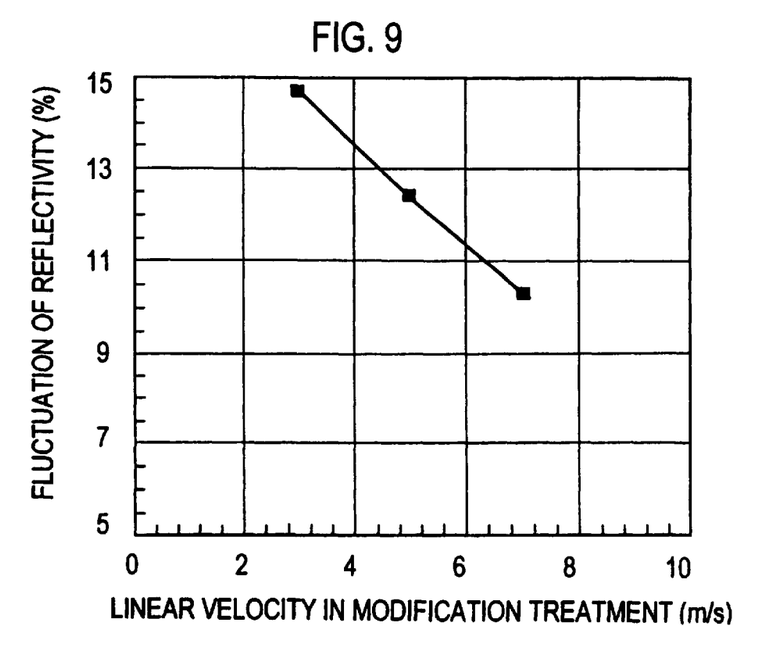
FIG. 9 is a graph showing fluctuation (%) of reflectivity in relation to linear velocity of the optical recording medium during the modulation treatment.

Optical recording discs were prepared by repeating the procedure of Example 2 except that the modification treatment was conducted by using a laser beam without pulse-modulation and the disc was rotated by varying the linear velocities as shown in FIG. 9. The thus prepared optical recording discs were evaluated for fluctuation of reflectivity by repeating the procedure of Example 2. The results are shown in FIG. 9.

As shown in FIG. 9, the optical recording disc exhibits large reflectivity fluctuation when the modulation treatment is conducted at a low linear velocity, which is the linear velocity like the one employed the prior art initialization. The reflectivity fluctuation, however, is suppressed to a low level when the modulation treatment is conducted at a high linear velocity. More illustratively, the reflectivity fluctuation is suppressed to the level of about 10% at the linear velocity of 7 m/s. In consideration of the situation that the overwritable linear velocity of the optical recording disc is 6 m/s, the modulation treatment of the optical recording disk may be carried out without using the pulse-modulated laser beam if the disc is irradiated with a DC laser beam at a linear velocity near the overwritable linear velocity of the disc. The modulation treatment accomplished was equivalent to the one using a pulse-modulated laser beam.

Example 5

Optical recording discs were prepared by repeating the procedure of Example 1 except that the recording layer was of the composition:

$Ge_aSb_bTe_{1-a-b}$ wherein a=0.22 and b=0.22; the recording layer was deposited to 20 nm; the first dielectric layer was deposited to 110 nm, the second dielectric layer was deposited to 25 nm, and the reflective layer was deposited to 100 nm.

The thus prepared optical recording disc was subjected to the modification treatment and the crystallization treatment by repeating the procedure of Example 1 (Sample No. 601). The optical recording disc was also initialized by the prior art method as in the case of sample No. 102 (Sample No. 602).

The thus prepared sample Nos. 601 and 602 were evaluated for reflectance fluctuation and jitter, and superiority of the modification and the crystallization treatments of the present invention was confirmed as in the case of the Examples as described above.

Figure 10:
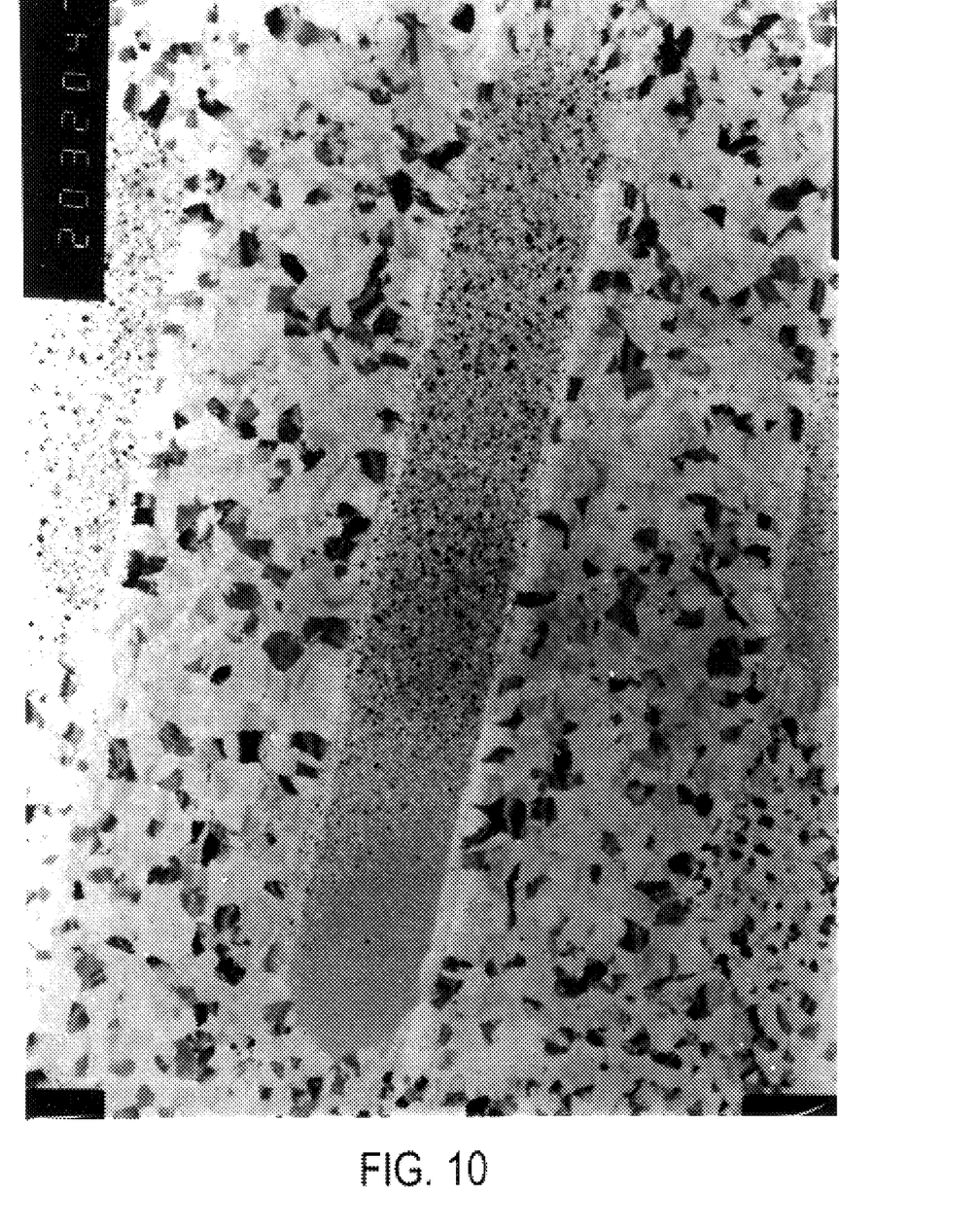
FIG. 10 is a transmission electron micrograph showing crystalline structure of the recording layer initialized by the prior art method.
Figure 11:
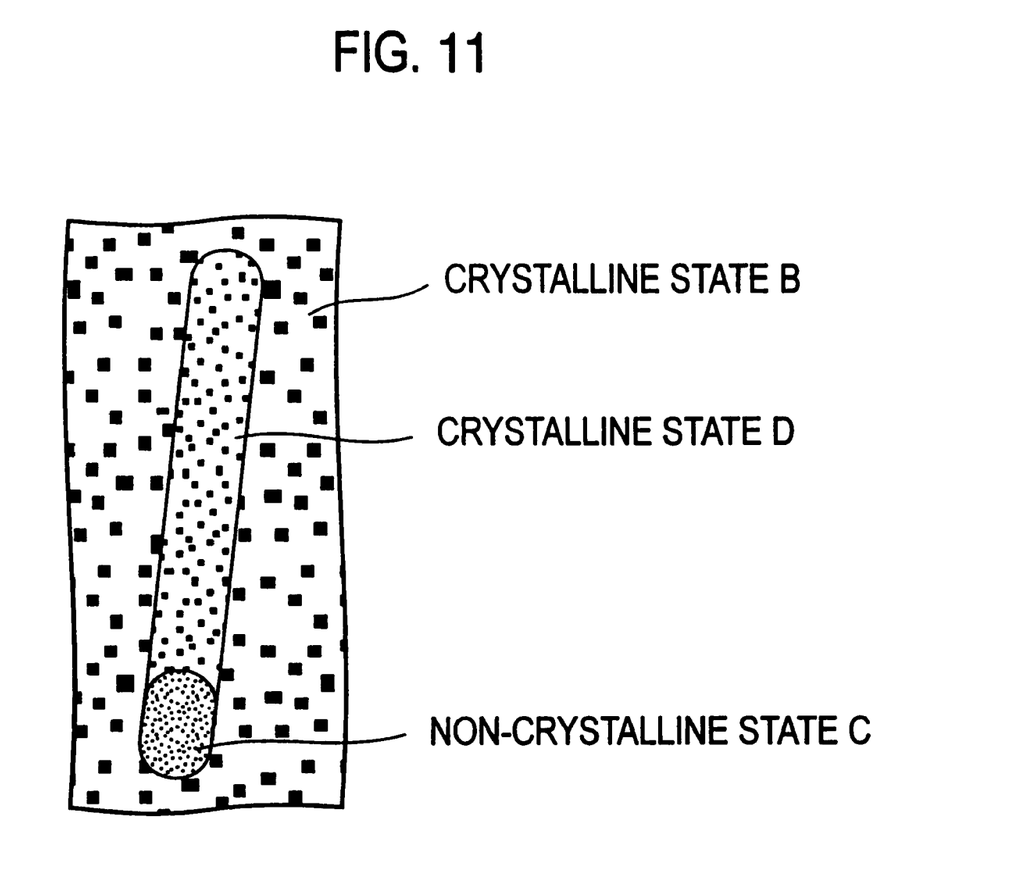
FIG. 11 is a schematic view explaining the transmission electron micrograph of FIG. 10.

In order to examine the problems associated with the prior art initialization, sample No. 602 after the overwriting was examined as described below by peeling the reflective layer, dissolving the polycarbonate substrate with chloroform, removing the first and second dielectric layers by etching with hydrofluoric acid to thereby leave the recording layer. FIG. 10 is a transmission electron micrograph of the recording layer, and this micrograph is explained by referring to FIG. 11. Of the elongated dark area extending through the central part of FIG. 10, the bottom one fifth is the record mark (in non-crystalline state C), and substantially no structure is found in this area. The remaining four fifth of the dark area is the region erased upon overwriting (in crystalline state D), and crystal grains of relatively small size are found in this area. The area surrounding the elongated dark area is region crystallized in the initialization (in crystalline state B), and crystal grains of relatively large size are found in this area. FIG. 10 concisely demonstrates that it was this difference in crystallinity between the crystalline state B and the crystalline state D that was responsible for the necessity of the "priming" treatment that had to be carried out after the conventional initialization to stabilize the reflectivity.

Japanese Patent Application No. 9-59837 is incorporated herein by reference as well as the above-cited patent publications.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for initializing an optical recording medium and comprising a substrate and a recording layer of phase change type formed thereon, comprising the steps of:

forming by sputtering the recording layer in a first non-crystalline state on said substrate;

melting and subsequently cooling the recording layer in said first non-crystalline state by irradiation into a second non-crystalline state which is different from the first non-crystalline state; and heating the recording layer in the second non-crystallization state by irradiation into a crystalline state using a lower intensity of radiation than used in said step of melting and subsequently cooling the recording layer.

2. The method for initializing an optical recording medium according to claim 1, wherein said step of heating and cooling is conducted by irradiating the recording layer immediately after its being formed on said substrate with a pulse-modulated laser beam.

3. The method for intializing an optical recording medium according to claim 1 wherein said recording layer contains Ge, Sb and Te.

4. The method for intializing an optical recording medium according to claim 1 wherein said recording layer contains Ag, In, Sb and Te.

* * * * *